United States Patent [19]

Koz et al.

[11] Patent Number: 5,566,301
[45] Date of Patent: Oct. 15, 1996

[54] ISDN AUDIOVISUAL TELESERVICES INTERFACE SUBSYSTEM

[75] Inventors: Mark C. Koz, Santa Clara, Calif.; Jack W. Lix, Lake Oswego, Oreg.

[73] Assignee: FutureTel, Inc., Sunnyvale, Calif.

[21] Appl. No.: 140,175

[22] PCT Filed: Nov. 16, 1992

[86] PCT No.: PCT/US92/09876

§ 371 Date: Jul. 19, 1994

§ 102(e) Date: Jul. 19, 1994

[87] PCT Pub. No.: WO93/16430

PCT Pub. Date: Aug. 19, 1993

Related U.S. Application Data

[63] Continuation-in-part of PCT/US92/01084, Feb. 11, 1992, published as WO93/16557, Aug. 19,1993, PCT/US92/01446, Feb. 24, 1992, published as WO93/17526, Sep. 2, 1993, and PCT/US92/04944, Jun. 11, 1992, published as WO93/26095, Dec. 23, 1993.

[51] Int. Cl.$^6$ .................................................. H04L 12/00
[52] U.S. Cl. ........................ 395/200.2; 379/90; 379/93; 379/96; 395/200.17; 395/250; 395/850; 395/872; 395/877; 395/200.13; 364/292.94; 364/DIG. 1; 364/222.2; 364/237.9; 364/238.5; 364/239.6; 364/239.7; 364/242.96
[58] Field of Search .......................... 370/77, 84, 94.1, 370/95.1, 110.1, 112; 375/219, 225; 395/200.12, 200.13, 200.14, 200.17, 200.2, 250, 850, 872, 877, 880, 881, 285, 286, 800; 379/90, 93, 96

[56] References Cited

U.S. PATENT DOCUMENTS

| 4,145,755 | 3/1979 | Suzuki et al. | 395/250 |
|---|---|---|---|
| 4,433,378 | 2/1984 | Leger | 395/280 |
| 4,441,162 | 4/1984 | Lillie | 395/200.2 |
| 4,513,370 | 4/1985 | Ziv et al. | 395/200.06 |
| 4,623,997 | 11/1986 | Tulpule | 370/85 |
| 4,625,307 | 11/1986 | Tulpule et al. | 370/85 |
| 4,635,254 | 1/1987 | Tulpule et al. | 370/85 |
| 4,754,395 | 6/1988 | Weisshaar et al. | 395/650 |
| 4,858,112 | 8/1989 | Puerzer et al. | 395/200.2 |
| 4,985,887 | 1/1991 | Mizuhara et al. | 370/58.2 |
| 4,985,891 | 1/1991 | Fujiwara et al. | 370/110.1 |

(List continued on next page.)

OTHER PUBLICATIONS

AT&T, Document 555–016–103, AT&T Technical Publications Dept. (1989).
The International Telegraph and Telephone Consultative Committee ("CCITT") Recommendation H.221, IXth Plenary Assembly, Melbourne, 14–25 Nov. 1988 pp. 106–118.
CCITT Recommendation H.242, Geneva 1990 pp. 1–92.
CCITT Recommendation Q.921, IXth Plenary Assembly, Melbourne, 14–25 Nov. 1988, pp. 19–141.
CCITT Recommendation Q.931, IXth Plenary Assembly, Melbourne, 14–25 Nov. 1988, pp. 7–362.
CCITT Recommendation, Q.930, Fascicle VI.II pp. 3–6.

*Primary Examiner*—Lance Leonard Barry, Esq.
*Attorney, Agent, or Firm*—Donald E. Schreiber

[57] ABSTRACT

The technical field of the invention generally concerns systems for audiovisual teleservices using digital telecommunication services such as Integrated Services Digital Network ("ISDN") communications. In the preferred embodiment, an interface subsystem (100) includes an ISDN interface circuit (130) for concurrently exchanging audiovisual information with an ISDN access. The interface subsystem (100) also includes a host computer interface circuit (144)for exchanging video, audio, high-speed, a low-speed data with a host digital computer. A computer program executed by a digital signal processing circuit (122) implements CCITT's H.221 and H.242 Recommendations for audiovisual teleservices, and provides a computer program at the application layer (44) of the OSI model that is executed by the host digital computer with an interface by which it can exchange video, audio, high-speed, and low-speed data with another compatible terminal using digital telecommunications.

32 Claims, 5 Drawing Sheets

U.S. PATENT DOCUMENTS

| | | | |
|---|---|---|---|
| 4,989,176 | 1/1991 | Kahn | 395/824 |
| 4,991,169 | 2/1991 | Davis et al. | 370/77 |
| 5,029,163 | 7/1991 | Chao et al. | 370/95.1 |
| 5,150,402 | 9/1992 | Yamada | 379/93 |
| 5,184,348 | 2/1993 | Abdelmouttalib et al. | 370/95.1 |
| 5,197,083 | 3/1993 | Gandini et al. | 375/225 |
| 5,228,033 | 7/1993 | Okouchi | 370/84 |
| 5,268,904 | 12/1993 | Umeda | 370/110.1 |
| 5,276,679 | 1/1994 | McKay et al. | 370/84 |
| 5,319,700 | 6/1994 | Mano et al. | 379/94.1 |
| 5,367,522 | 11/1994 | Otani | 370/84 |
| 5,440,091 | 8/1995 | Carrafiello et al. | 395/250 |

ISDN AUDIOVISUAL TELESERVICES INTERFACE SUBSYSTEM

This is a continuation-in-part of PCT International Patent Applications that designated the U.S. Nos. PCT/US92/01084 filed 11 Feb. 1992, that was published 19 Aug. 1993, International Publication No. WO 93/16557; PCT/US92/01446 filed 24 Feb. 1992, that was published 2 Sep. 1993, International Publication No. WO 93/17526; and PCT/US92/04944 filed 11 Jun. 1992, that was published 23 Dec. 1993, International Publication No. WO 93/26095.

TECHNICAL FIELD

The present invention relates generally to the technical field of digital telecommunication and, more particularly, to communicating audiovisual information using digital telecommunications services such as Integrated Services Digital Network ("ISDN") communication.

BACKGROUND ART

To deal rationally with the complexity of present communication systems and with the need to make different systems mutually compatible, the International Standards Organization ("ISO") developed a model for specifying such systems. Using this model, called the Open Systems Interconnect ("OSI") model, a communication system can be broken down into a hierarchial structure that permits standards to be defined at each level in the structure. The OSI model provides a hierarchy of seven different layers that can occur in a communication system. Each layer in the OSI model specifies a different function performed by the communication system.

The lowest layer in the OSI model, called the physical layer, specifies the physical structure of interfaces in a particular communication system or network. Thus, a standard for the physical layer of a communication system specifies such things as the number of wires, their electrical characteristics, the characteristics of signals transmitted over the wires, connectors used for joining two sets of wires into a single longer set of wires, etc.

The next higher layer in the OSI model, called the data link layer, specifies how data is transmitted error free through the communication system. Thus, a standard for the second layer in the OSI model specifies how to detect errors in transmissions passing over the physical layer, and how to correct any errors that may occur during transmission.

The next higher layer in the OSI model, called the network layer, specifies the manner in which connections are formed between various places in the communication system for transmitting data between them. The standard for the third layer in the OSI model, therefore, specifies the signals transmitted over the data link layer that cause the communication system to transfer data between two places on the network.

A recommendation by an International Telegraph and Telephone Consultative Committee ("CCITT") for the ISDN communication channel specifies the three lowest levels in the OSI model. Under the CCITT recommendation, a basic ISDN access consists of two full-duplex 64 kilobits per second ("kbps") digital data channels, called channel B1 and channel B2, plus another full-duplex 16-kbps digital channel, called a D-channel. Under the CCITT recommendation, using time division multiplexing, all three of these digital data channels may be transmitted over a single pair of twisted wires, or over two pairs of twisted wires. ISDN basic rate access, as specified by CCITT, was originally intended to provide a basic digital data transmission capability suitable for use by individuals such as in their homes or small businesses.

When ISDN basic rate access was initially specified, each of the B-channels was intended to carry either:

1. digital data, such as that from a personal computer or from a computer terminal;
2. Pulse Code Modulation ("PCM") encoded digital voice communication; or
3. a mixture of lower data rate communications including digital data and digitized voice that were each encoded at a fraction of each B-channel's full 64-kbps capacity.

Under the ISDN recommendation, the D-channel serves two purposes. First, the D-channel carries signaling information that controls the transmission of data over the two B-channels. In addition, when the D-channel is not carrying signaling information, it may be used to transmit packet-switching or low-speed telemetry. The combined data rate at which digital data may be transmitted over twisted pairs of wires in accordance with the ISDN recommendation for basic rate access is 144-kbps, i.e. 128-kbps for the combined B1 and B2 channels plus 16-kbps for the D-channel.

In addition to the ISDN basic rate access specified by CCITT, that organization has also specified a higher performance ISDN communication channel called primary rate access. Depending upon the particular geographic region of the world, using time division multiplexing an ISDN primary rate access has either twenty-four (24) time-slots or thirty-two (32) time-slots, each one of which carries the information of a single ISDN B-channel. The ISDN primary rate access having 24 time-slots is called a T1-connection. The ISDN primary rate access having 32 time-slots is called a E1-connection. One way in which ISDN primary rate access uses these 24 or 32 time-slots is for each of 23 or 30 time-slots to carry independent B-channels of information with a remaining time-slot carrying a D-channel of control data.

Moreover, groups of the 23 or 30 time-slots in an ISDN primary rate access may also be used collectively to carry digital information at higher data rates. For example, using a connection identified as H0, six (6) time-slots of an ISDN primary rate access may be dedicated to simultaneously carrying 6 B-channels of information. Thus, an ISDN H0-connection carries 384-kbps of digital information. In addition to the H0-connection, CCITT has also specified a service called a H11-connection which similarly consists of 24 B-channels. A H11-Connection may be established over an E1-connection or alternatively over a T1-connection plus an independent D-channel of control data. Thus, a H11-connection simultaneously carries 24 B-channels of information. CCITT has also specified a service called a H12-connection in which an E1-connection's 32 time-slots simultaneously carry 30 B-channels of information plus a D-channel of control data.

Building upon CCITT's ISDN recommendation, it has also established a recommendation, H.221, which specifies data structures used in transmitting audiovisual teleservices over channels having bandwidths from 56 to 1,920 kbps. CCITT's H.221 Recommendation specifies data structures for communicating audiovisual information over from 1 to 6 B-channels, from 1 to 5 H0-connections, or over either a H11 or a H12-connection. Using 1 to 6 B-channels for transmitting audiovisual information provides data transmission rates of 64 to 384 kbps in increments of 64 kbps. Using 1 to 5 H0-connections provides data transmission rates of 384 to 1,920 kbps in increments of 384 kbps. A H11- connection provides a data transmission rate of 1,536 kbps, while a H12-connection provides a data transmission rate of 1,920 kbps.

In addition to the H.221 Recommendation, CCITT has also established a recommendation, H.242, which specifies a protocol for establishing audiovisual teleservices. The H.242 Recommendation establishes procedures by which two audiovisual terminals intercommunicate prior to and during an exchange of audiovisual information to match their respective capabilities for transmitting and receiving audiovisual information. Included among the capabilities intercommunicated between two such terminals are their respective audio capabilities, video capabilities, transfer rate capabilities data capabilities, encryption capabilities, and bit-rate allocation signal ("BAS") capabilities.

Figure 1:
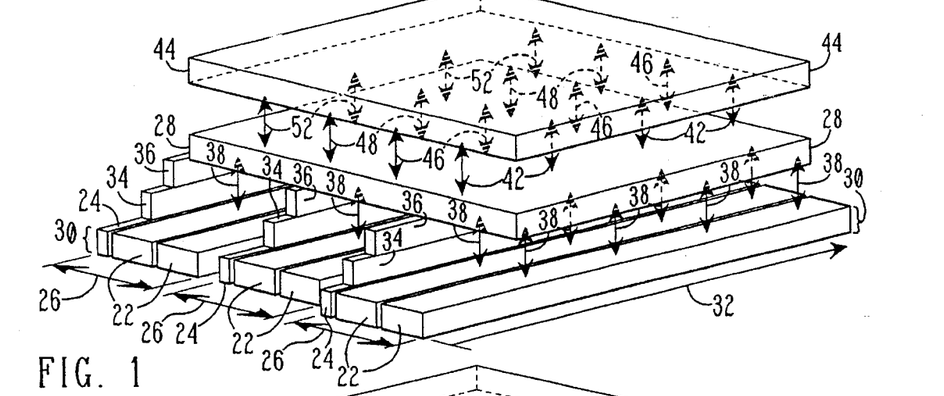
FIG. 1 is a diagram illustrating data transfer relationships among the B-channels and D-channels of three ISDN basic rate accesses and a layer representing the CCITT H.221 Recommendation, and between the H.221 layer and an application layer.

FIG. 1 illustrates the relationship that exists among B-channels 22 and D-channels 24 of three ISDN basic rate accesses 26 and a layer 28 corresponding to the CCITT H.221 Recommendation. The B-channels 22 and the D-channels 24 belong to a layer 30 that implements the CCITT I.400 Recommendation. In the illustration of FIG. 1, an arrow 32 indicates the passage of time from the beginning of an audiovisual telecommunication until its end. FIG. 1 also illustrates the superposition over each D-channel 24 of a layer 34 that implements a CCITT Q.921 Recommendation, and a layer 36 that implements a CCITT Q.931 Recommendation. The layers 34 and 36 provide independent call set-up and tear-down for each of the ISDN basic rate accesses 26. Sets of double-headed arrows 38 extending between each of the B-channels 22 and the H.221 layer 28 indicate bidirectional exchanges of audiovisual information between the two layers 30 and 28.

In addition to exchanges of audiovisual information between the layers 30 and 28, a set of double-headed arrows 42 indicate bidirectional exchanging of video data between the H.221 layer 28 and an application layer 44 which may use received video data to generate a visible image. To provide the application layer 44 with video data, the H.221 layer 28 extracts such data from the audiovisual information that it receives from the B-channels 22. Correspondingly, the H.221 layer 28 embeds video data that it receives from the application layer 44 into the audiovisual information that it transmits to the B-channels 22. A set of double-headed arrows 46 indicate bidirectional exchanging of audio data between the H.221 layer 28 and the application layer 44 which may use the audio data to generate an audible sound. Similar to the processing of audiovisual information and video data by the H.221 layer 28, the layer 28 extracts audio data from the audiovisual information that it receives from the B-channels 22 and passes the audio data to the application layer 44. The H.221 layer 28 also embeds audio data received from the application layer 44 into the audiovisual information that it passes to the B-channels 22. Sets of double-headed arrows 48 and arrows 52 indicate bidirectional exchanging respectively of high-speed data and low-speed data between the H.221 layer 28 and the application layer 44. The H.221 layer 28 extracts the high-speed, and low-speed data from the audiovisual information that it receives from the B-channels 22 and transmits such data to the application layer 44, and it embeds the high-speed, and low-speed data that it receives from the application layer 44 into the audiovisual information that it transmits to the B-channels 22.

Figure 2:
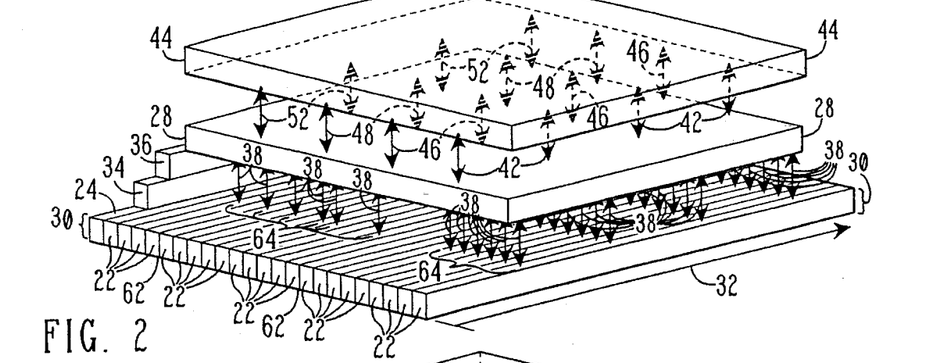
FIG. 2 is a diagram illustrating data transfer relationships among the B-channels and D-channel of an ISDN primary rate accesses and a layer representing the CCITT H.221 Recommendation, and between the H.221 layer and an application layer.

FIG. 2 illustrates the relationships that exists among the H.221 layer 28 and twenty-three (23) B-channels 22 and a D-channel 24 respectively carried by twenty-four (24) time-slots of an ISDN primary rate access 62. The B-channels 22 and the D-channel 24 of the ISDN primary rate access 62 implement the I.400 layer 30. In the illustration of FIG. 2, the CCITT Q.921 layer 34 and CCITT Q.931 layer 36 are superimposed over the time-slot of the ISDN primary rate access 62 which carries the D-channel 24. Similar to FIG. 1, the sets of double-headed arrows 38 extending between various of the B-channels 22 and the H.221 layer 28 indicate bidirectional exchanging of audiovisual information between the two layers 30 and 28. Two sets of six arrows 38 each in FIG. 2 represent two H0-connections 64. In the illustration of FIG. 2, one of the H0-connections 64 is made up of 6 B-channels 22 respectively carried in six immediately adjacent time-slots. FIG. 2 also illustrates six randomly assigned time-slots carrying the six B-channels 22 which make up the other H0-connection 64. As indicated by the sets of double-headed arrows 42, 46, 48 and 52 in FIG. 2 which are identical to the sets of double-headed arrows 42, 46, 48 and 52 in FIG. 1, other than for the rate of data transmission a H.221 layer 28 exchanging audiovisual information with one or more H0-connections 64 provided by an ISDN primary rate access 62 may present an identical interface to the application layer 44 for exchanging video, audio, high-speed, and low-speed data as the H.221 layer 28 illustrated in FIG. 1 that exchanges audiovisual information with three ISDN basic rate accesses 26.

Figure 3:
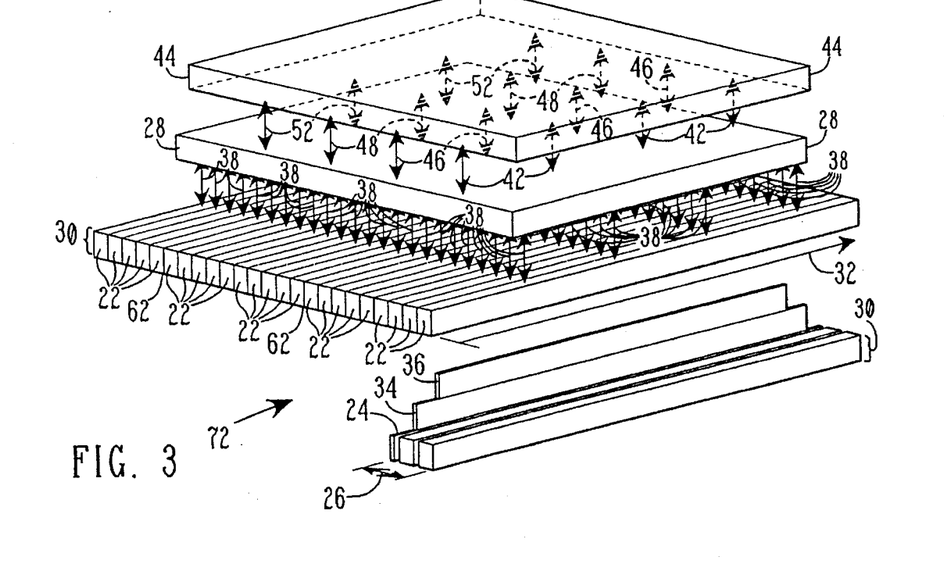
FIG. 3 is a diagram illustrating data transfer relationships among the B-channels and D-channel of a H11-connection, made up of an ISDN primary rate accesses and an ISDN basic rate access, and a layer representing the CCITT H.221 Recommendation, and between the H.221 layer and an application layer.

FIG. 3 illustrates the relationship among the H.221 layer 28 and the B-channels 22 and the D-channel 24 of a H11-connection indicated by the general reference character 72. The H11-connection 72 is made up of an ISDN primary rate access 62 and an ISDN basic rate access 26. Similar to the illustrations of FIGS. 1 and 2, the ISDN primary rate access 62 combined with the ISDN basic rate access 26 depicted in FIG. 3 implement the I.400 layer 30 of the H11-connection 72. In accordance with the I.400 Recommendation for a H11-connection 72, the D-channel 24 of the ISDN basic rate access 26 carries control information used by the CCITT Q.921 layer 34 and the CCITT Q.931 layer 36. Thus in the H11-connection 72, all twenty-four (24) time-slots of the ISDN primary rate access 62 are used as B-channels 22 for exchanging audiovisual information with the H.221 layer 28 as indicated by the sets of double-headed arrows 38. As indicated by the sets of double-headed arrows 42, 46, 48 and 52 in FIG. 3 which are identical to the sets of double-headed arrows 42, 46, 48 and 52 in FIGS. 1 and 2, other than for the rate of data transmission a H.221 layer 28 exchanging audiovisual information with twenty-four B-channels 22 provided by a H11-connection 72 may present an identical interface to the application layer 44 for exchanging video, audio, high-speed, and low-speed data as the H.221 layer 28 respectively illustrated in FIG. 1 or in FIG. 2.

If two terminals exchange audiovisual information using a H11-connection 72, a H12-connection, or a single H0-connection 64, then ISDN's operation inherently preserves the inter B-channel phase relationship from the transmitting terminal's H.221 layer 28 to the receiving terminal's H.221 layer 28. For any other form of ISDN transmission permitted under CCITT's H.221 Recommendation, preservation of the phase relationship between B-channels 22 is not assured. Skew can occur between data received on different B-channels 22 even if the receiving terminal connects to a ISDN primary rate access 62 when the transmitting terminal connects to two or more B-channels 22 of ISDN basic rate accesses 26, or conversely. That is, if two or more H0-connections 64 or two or more B-channels 22 on an ISDN basic rate accesses 26 are used for transmitting or receiving audiovisual teleservices, data transmitted in-phase need not arrive in-phase at the receiving terminal. Such skew in received data may occur whenever audiovisual teleservices are transmitted over B-channels 22 established by placing different telephone calls. CCITT's ISDN Recommendation permits the inter B-channel skew between two H0-connections 64 or between two B-channels 22 of ISDN basic rate accesses 26 to be as great as 1,200 milliseconds. This skew between information carried in B-channels 22 of different H0-connections 64 or the different B-channels 22 of ISDN basic rate accesses 26 occurs because HO-connections 64 or B-channels 22 of ISDN basic rate accesses 26 may be transmitted between terminals over different paths.

While the CCITT H.221 Recommendation specifies a structure for digital audiovisual information transmitted over various different ISDN accesses or connections, it does not disclose nor does it suggest any digital circuit and/or computer hardware and/or computer software capable of effecting such a communication. Furthermore, the CCITT H.221 Recommendation provides no suggestion of an interface, i.e. data structures and protocols, for exchanging video, audio, high-speed, and low-speed data between the H.221 layer and an application program executed in a host computer.

DISCLOSURE OF INVENTION

An object of the present invention is to provide an interface subsystem for exchanging audiovisual information over digital telecommunications in accordance with CCITT's H.221 Recommendation.

Yet another object of the present invention is to provide a cost effective interface subsystem capable of exchanging audiovisual information in accordance with CCITT's H.221 Recommendation.

A further object of the present invention is to provide a modular interface subsystem that may be programmed to exchange audiovisual information in accordance with CCITT's H.221 Recommendation.

A further object of the present invention is to provide an interface subsystem for audiovisual teleservices that is programmable from a host digital computer.

A further object of the present invention is to provide a modular interface subsystem capable of exchanging audiovisual information in accordance with CCITT's H.221 Recommendation between computers employing the Industry Standard Architecture ("ISA") bus.

A further object of the present invention is to provide data structures and protocols adapted for exchanging messages and/or data between an audiovisual application being executed within a computer and an interface subsystem that exchanges audiovisual information with other interface subsystems using digital telecommunications in accordance with CCITT's H.221 Recommendation.

Yet another object of the present invention is to provide an interface subsystem capable of simultaneously exchanging audiovisual information in accordance with CCITT's H.221 Recommendation with several independent digital telecommunications accesses.

Briefly in its presently preferred embodiment an interface subsystem in accordance with the present invention includes an ISDN basic rate interface circuit for exchanging digital audiovisual information with a first ISDN basic rate access. The interface subsystem in accordance with the present invention also includes a second ISDN interface circuit for exchanging digital audiovisual information with at least a second ISDN access. In one embodiment of the present invention, this second ISDN access may consist of one or more basic rate accesses. In an alternative embodiment of the present invention, this second ISDN access may be a primary rate access. The interface subsystem also includes a host computer interface circuit for exchanging digital audiovisual information with a host digital computer. In one embodiment of the present invention, the host computer interface circuit adapts the interface subsystem for exchanging digital audiovisual information with a digital computer employing an ISA bus. A random access memory ("RAM") is also included in the interface subsystem for storing digital audiovisual information received by any of the interface circuits.

The interface subsystem further includes a digital signal processing circuit that is coupled to all the interface circuits and to the RAM for controlling the operation of the interface circuits. The digital signal processing circuit exchanges digital audiovisual information with the interface circuits, and processes such data that it receives from the interface circuits. In processing received digital audiovisual information, the digital signal processing circuit synchronizes digital audiovisual information received by the interface subsystem from several ISDN basic rate accesses, or from a single ISDN primary rate access. In processing digital audiovisual information, the digital signal processing circuit also multiplexes digitized video, audio and data signals that are exchanged over the several ISDN accesses. The digital signal processing circuit also controls the operation of the interface circuits to respond to initiation of ISDN audiovisual teleservices, and to effect initiation of such services if so requested by the host digital computer. In the presently preferred embodiment, the digital signal processing circuit is an integrated circuit digital signal processor that receives each successive word of audiovisual information following its receipt by the ISDN interface circuits, and that transmits each successive word of audiovisual information to the ISDN interface circuits for transmission to the several ISDN accesses.

The RAM included in the interface subsystem contains a plurality of receiving circular buffers that receive a plurality of frames of audiovisual information. The RAM also contains a plurality of sort buffers each addressable location of which holds an octet, eight bits, of audiovisual information received from individual B-channels 22. The octets stored in the sort buffers are scanned to locate a frame alignment signal ("FAS") specified by CCITT's H.221 Recommendation. After the FAS has been located, the sort buffers receive successive frames of audiovisual information from individual B-channels 22 with FAS located in the eighth bit of the first octet through the eighth bit of the eight octet in the sort buffers. Video, audio, high-speed, and low-speed data are then extracted from successive frames of audiovisual information in the sort buffers and stored into individual data buffers located in the RAM of the interface subsystem. A set of host computer interface receiving buffers then receive and store the video, audio, high-speed, and low-speed data from which such data may be removed by the host digital computer. The interface subsystem also includes a set of host computer interface transmitting buffers that receive video, audio, high-speed, and low-speed data from the host digital computer for transmission as audiovisual information from the ISDN interface circuit. The host computer interface receiving buffers and transmitting buffers are preferably located in shared RAM that is located in the host computer interface circuit.

Under particular operating circumstances, the interface subsystem may receive a single stream of audiovisual information from a plurality of ISDN connections, such as several H0-connections 64. Under such circumstances, all the video, audio, high-speed, and low-speed data extracted from the audiovisual information is stored into a single set of host computer interface receiving buffers. Under other operating circumstances, the interface subsystem may receive individual streams of audiovisual information from a plurality of ISDN connections, again such as several H0-connections 64. If this second circumstance occurs, the video, audio, high-speed, and low-speed data extracted from the audiovisual information is stored into several sets of host computer interface receiving buffers. This second operating mode of the interface subsystem permits establishment of conference audiovisual teleservices fully compatible with CCITT's H.221 Recommendation.

To effectively and efficiently utilize the various operating characteristics of the interface subsystem, the interface subsystem exchanges messages with the host digital computer for reporting its status to the host digital computer, and for receiving control information from the host digital computer. For example, the interface subsystem is adapted to receive a message from the host digital computer for selecting among video, audio, high-speed, and low-speed data for storage into the set of host computer interface receiving buffers, or for transmission as audiovisual information from the ISDN interface circuit. Furthermore, the interface subsystem sends a message to the host digital computer if the set of host computer interface receiving buffers become full of data. Correspondingly, the interface subsystem sends a message to the host digital computer if the set of host computer interface transmitting buffers lack data.

An advantage of the present invention is that it adapts a digital computer which employs the ISA bus for receiving and/or transmitting digital audiovisual information in accordance with CCITT's H.221 Recommendation.

These and other features, objects and advantages will be understood or apparent to those of ordinary skill in the art from the following detailed description of the preferred embodiment as illustrated in the various drawing figures.

BEST MODE FOR CARRYING OUT THE INVENTION

Figure 4:
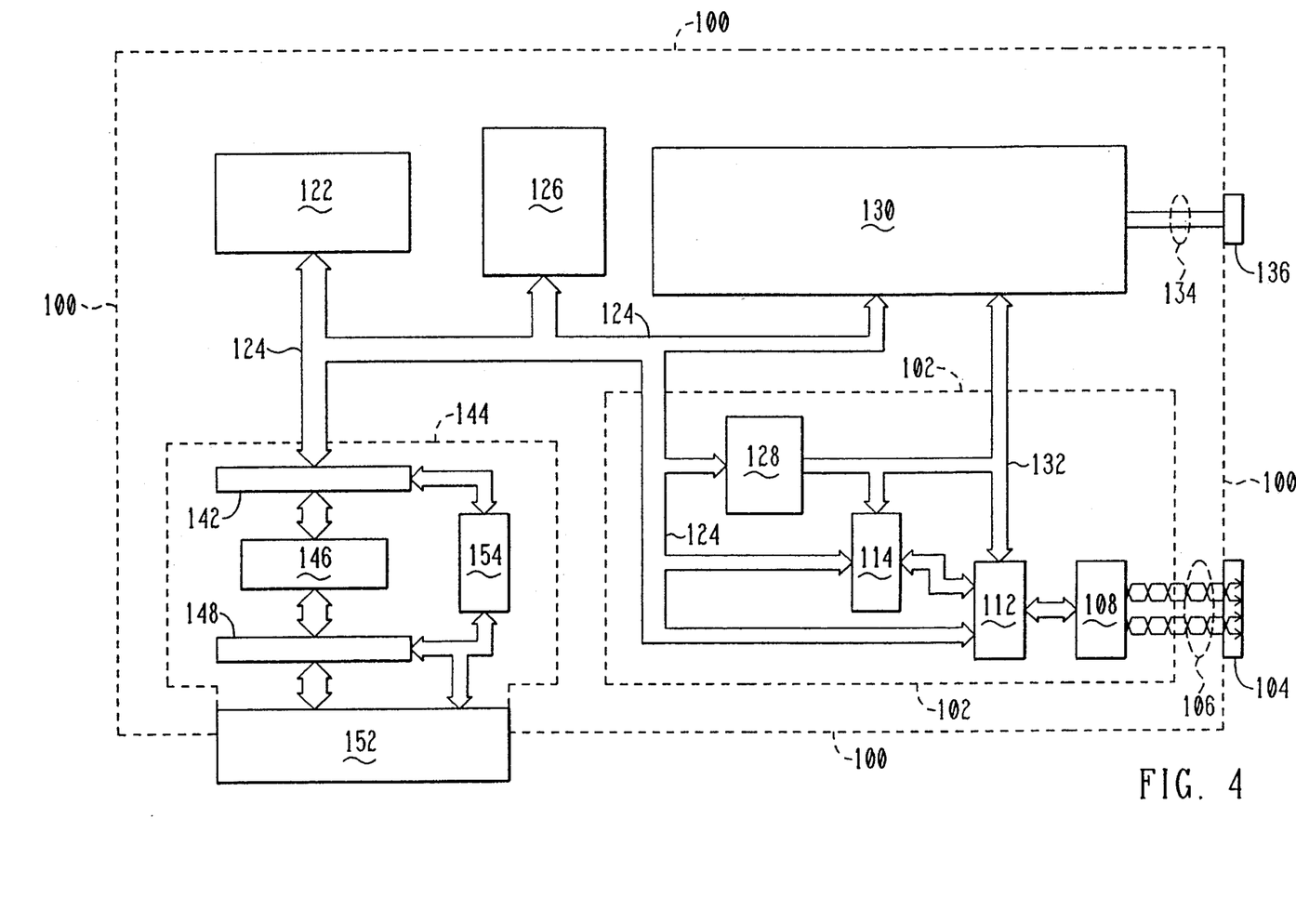
FIG. 4 is a functional-type block diagram depicting an interface subsystem in accordance with the present invention including its ISDN basic rate interface circuit, its second interface circuit, its host computer interface circuit, its RAM, and its digital signal processing circuit.

The block diagram of FIG. 4 depicts an interface subsystem in accordance with the present invention enclosed within a dashed line 100. The interface subsystem 100 includes an ISDN basic rate interface circuit 102 for exchanging audiovisual teleservice signals with an ISDN basic rate access 26 (not illustrated in FIG. 4) via a first ISDN basic rate access connector 104. Two pairs of electrical leads 106 couple the first ISDN basic rate access connector 104 to an isolation transformer circuit 108. The isolation transformer circuit 108 electrically isolates an Am79C32 ISDN Data Controller ("IDC") integrated circuit 112, with which it exchanges audiovisual teleservice signals, from signals present on an ISDN basic rate access 26 (not illustrated in FIG. 4). The IDC 112, which is marketed by Advanced Micro Devices, Inc. ("AMD"), 901 Thompson Place, Sunnyvale, Calif. 94088-3453, is more completely described in an AMD publication entitled "Communication Products Overview" copyright 1991, AMD publication no. 15513A. The IDC 112 provides data transmission and reception capability on the two (2) B-channels 22 and the D-channel 24 of a four-wire S/T ISDN basic rate access 26. The IDC 112 also exchanges audiovisual teleservice signals with an Am82525 High-Level Serial Communications Controller Extended ("HSCX") integrated circuit 114. The HSCX 114, also marketed by AMD, is also more completely described in the AMD "Communication Products Overview" publication. In receiving or transmitting audiovisual teleservices via an ISDN basic rate access 26, the IDC 112 processes information exchanged over the D-channel 24, while the HSCX 114 processes information exchanged over the two B-channels 22.

Both the IDC 112 and the HSCX 114 exchange audiovisual information with a digital signal processing circuit 122 via an interface subsystem bus 124. The digital signal processing circuit 122 is preferably a TMS320C25 Digital Signal Processor ("DSP"), which is marketed by Texas Instruments Incorporated ("TI"), Post Office Box 809066, Dallas, Tex. 75380-9066. The TMS320C25 is more completely described in a TI publication entitled "TMS320C2x User's Guide" copyright 1990, TI publication no. 164907-9721 revision B December 1990. The interface subsystem bus 124 also connects the digital signal processing circuit 122 to a memory 126, a programmable array logic ("PAL") integrated circuit 128, and to a second ISDN interface circuit 130. An ISDN access control and status signal bus 132 couples the PAL 128 to the IDC 112, to the HSCX 114, and to a second ISDN interface circuit 130. The PAL 128 adapts various control signals transmitted by the digital signal processing circuit 122 for controlling the operation of the IDC 112, the HSCX 114, and the second ISDN interface circuit 130; and adapts various status signals transmitted by the IDC 112, the HSCX 114, or the second ISDN interface circuit 130 for receipt by the digital signal processing circuit 122. The memory 126 preferably includes 320 kilobytes of static RAM and 64 kilobytes of read only memory ("ROM") The ROM of the memory 126 stores only a "boot routine" sufficient to enable loading a computer program executed by the digital signal processing circuit 122 into the RAM of the memory 126, preferably from a host digital computer (Not illustrated in FIG. 4).

The second ISDN interface circuit 130 adapts the interface subsystem 100 for exchanging audiovisual teleservice signals with additional ISDN accesses. In the presently preferred embodiment, the second ISDN interface circuit 130 may be selected to adapt the interface subsystem 100 for exchanging audiovisual teleservice signal either with two additional ISDN basic rate accesses 26, or, as illustrated in FIG. 4, with a single ISDN primary rate access 62. To adapt the interface subsystem 100 for exchanging audiovisual teleservice signals with an ISDN primary rate access 62, electrical leads 134 connect the second ISDN interface circuit 130 to a primary rate access connector 136, and the second ISDN interface circuit 130 is selected from one of two different types of Line Card Stiks ("LCS") marketed by Dallas Semiconductor, 4401 South Beltwood Parkway, Dallas, Tex. 75244-3292. To adapt the interface subsystem 100 for exchanging audiovisual teleservice signals with a 1,536 kbps ISDN primary rate access 62 of the type employed in many countries throughout the world such as in the United States and Japan, the second ISDN interface circuit 130 is preferably a DS2283 Enhanced T1 LCS. To adapt the interface subsystem 100 for exchanging audiovisual teleservice signals with a 2,048 kbps ISDN primary rate access 62, which is employed in many European countries, the second ISDN interface circuit 130 is preferably a DS2281 CEPT LCS. Both the DS2283 LCS and the DS2281 LCS are more completely described in a Dallas Semiconductor 1992-1993 Product Data Book. To adapt the interface subsystem 100 for exchanging audiovisual teleservice signals with two additional ISDN basic rate accesses 26, the second ISDN interface circuit 130 incorporates one HSCX 114, two IDCs 112, two isolation transformer circuits 108, two dual pairs of electrical leads 106, and two ISDN basic rate access connectors 104, that are respectively interconnected with the interface subsystem bus 124 and with the PAL 128 in substantially the same manner as depicted in FIG. 4 and described above.

If the interface subsystem 100 as described above exchanges audiovisual teleservice signals with a H12-connection, it may exchange audiovisual information with thirty (30) B-channels 22 of the ISDN primary rate access 62 at a combined data rate of 1,920 kbps. The H.221 layer 28 of such an interface subsystem 100 may also exchange audiovisual information at a data rate of 384 kbps with a H0-connection provided by only six (6) B-channels 22 of the thirty (30) or twenty-four (24) B-channels 22 provided by the ISDN primary rate access 62. Similarly, the H.221 layer 28 of such an interface subsystem 100 may exchange audiovisual information at data rates from 64 kbps to 384 kbps in increments of 64 kbps with one (1) to six (6) B-channels 22 of the thirty (30) or twenty-four (24) B-channels 22 provided by the ISDN primary rate access 62. If the interface subsystem 100 described above exchanges audiovisual teleservices with a H11-connection 72 such as that depicted in FIG. 3 rather than a H12-connection, the only difference in the operation of the interface subsystem 100 from that described above for a H12-connection is that the maximum rate at which H.221 layer 28 may exchange audiovisual information with the ISDN primary rate access 62 reduces from 1,920 kbps to 1,536 kbps. This reduction in the maximum data rate occurs because the ISDN primary rate access 62 of a H11-connection 72 provides only twenty-four (24) B-channels 22 rather than the thirty (30) B-channels 22 provided by a H12-connection.

If the interface subsystem 100 exchanges audiovisual teleservice signals with only an ISDN primary rate access 62, then the H.221 layer 28 of such an interface subsystem 100 may exchange audiovisual information at a data rate of 384 kbps with a H0-connection provided by only six (6) B-channels 22 of the thirty (30) or twenty-four (24) B-channels 22 provided by the ISDN primary rate access 62. Alternatively, the H.221 layer 28 of such an interface subsystem 100 may exchange audiovisual information at data rates from 64 kbps to 384 kbps in increments of 64 kbps with one (1) to six (6) B-channels 22 of the thirty (30) or twenty-four (24) B-channels 22 provided by the ISDN primary rate access 62. If the interface subsystem 100 exchanges audiovisual teleservice signals with one (1) to three (3) ISDN basic rate accesses 26, the H.221 layer 28 of such an interface subsystem 100 may exchange audiovisual information at data rates of 64 kbps or 128 kbps with one (1) or two (2) of the B-channels 22 provided by only a single ISDN basic rate access 26, at 64 kbps to 256 kbps in increments of 64 kbps using one (1) to four (4) B-channels 22 provided by two ISDN basic rate accesses 26, and at 64 kbps to 384 kbps in increments of 64 kbps using one (1) to six (6) B-channels 22 provided by three ISDN basic rate accesses 26.

A multi-tasking computer program stored in the memory 126 and executed by the digital signal processing circuit 122 supervises the overall operation of the ISDN basic rate interface circuit 102 and of the second ISDN interface circuit 130 to effect the exchange of audiovisual information between the various ISDN accesses and the interface subsystem 100. Thus, the computer program executed by the digital signal processing circuit 122 processes digital data received from or transmitted to these ISDN accesses appropriately in accordance with the protocols established by CCITT's Q.921 Recommendation, its Q.931 Recommendation, its H.242 Recommendation, and its H.221 Recommendation.

The interface subsystem bus 124 also connects the digital signal processing circuit 122 and the memory 126 to interface subsystem transceivers 142 that are included in a host computer interface circuit 144. The interface subsystem transceivers 142 are coupled to a shared RAM 146 which stores 32 kilo-words of data. The shared RAM 146 is also coupled to ISA bus transceivers 148 which are coupled to a connector 152 that plugs into the ISA bus (not illustrated in FIG. 4). An arbitration circuit 154 connects to the interface subsystem transceivers 142, to the ISA bus transceivers 148, and to the ISA connector 152. Responsive to request signals received from the interface subsystem transceivers 142, from the ISA bus transceivers 148, and from the ISA connector 152, the arbitration circuit 154 assigns control over the operation of the shared RAM 146 to either/the digital signal processing circuit 122 or to a host computer which controls the operation of the ISA bus (not illustrated in FIG. 4). The host computer interface circuit 144 permits the computer program executed by the digital signal processing circuit 122 and a computer program executed by the host computer to interact with each other so the host computer can control the overall operation of the interface subsystem 100 while the interface subsystem 100 effects the exchange of audiovisual information with several ISDN accesses, and the exchange of video, audio, high-speed data, and low-speed data with the host computer.

Figure 5:
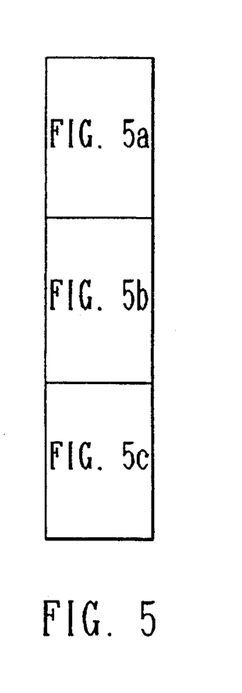
FIG. 5, is a diagram depicting the interrelationship between FIGS. 5a, 5b and 5c, the combined FIGS. forming a diagram that depicts data structures which exist in the RAM of the interface subsystem and in a memory in its host computer interface circuit, and that are used in exchanging audiovisual teleservices data with the I.400 layer, in processing such data through a H.221 layer, and in supplying video, audio, high-speed, and low-speed data to an application layer.
Figure 5A:
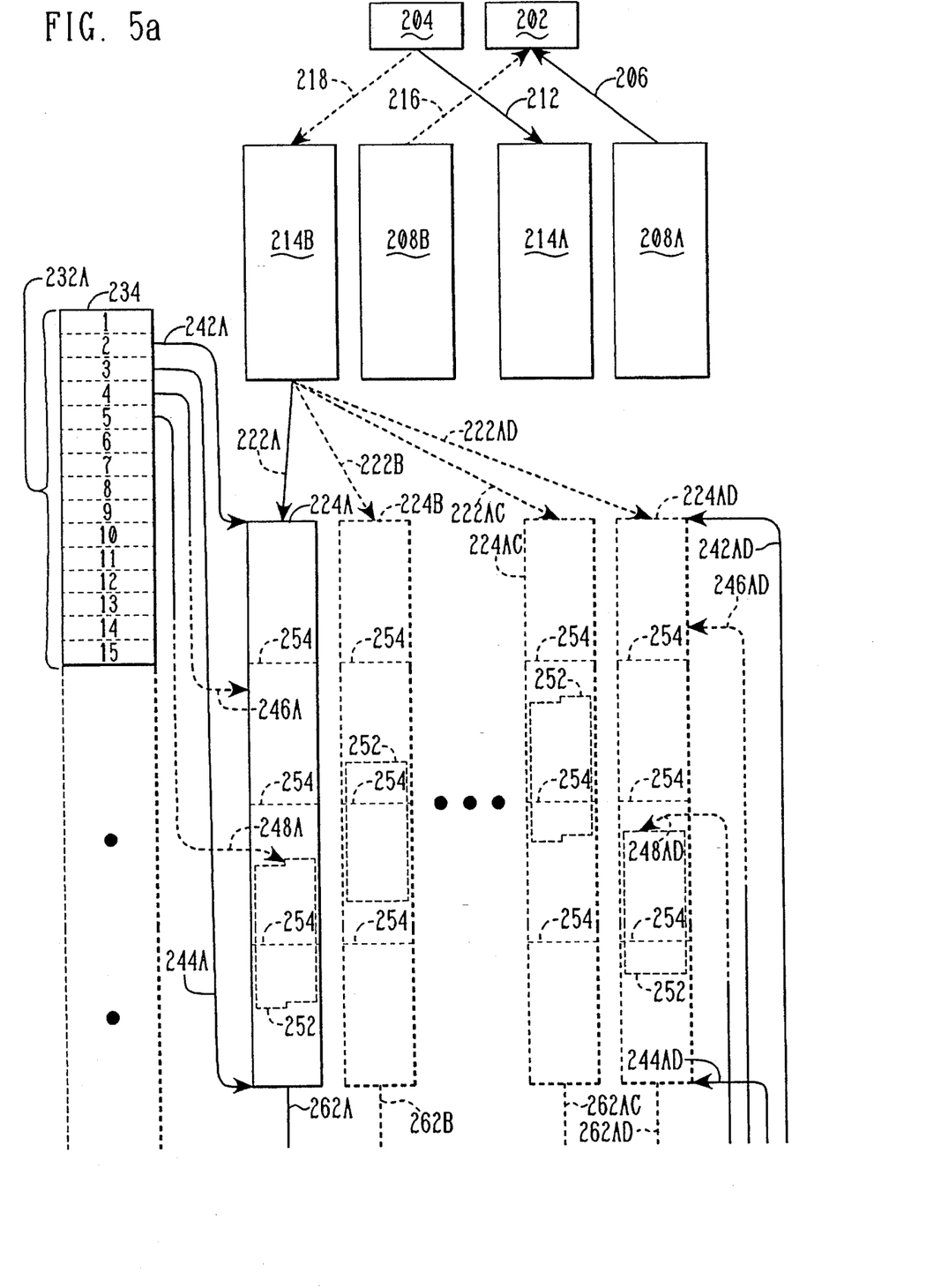
Figure 5B:
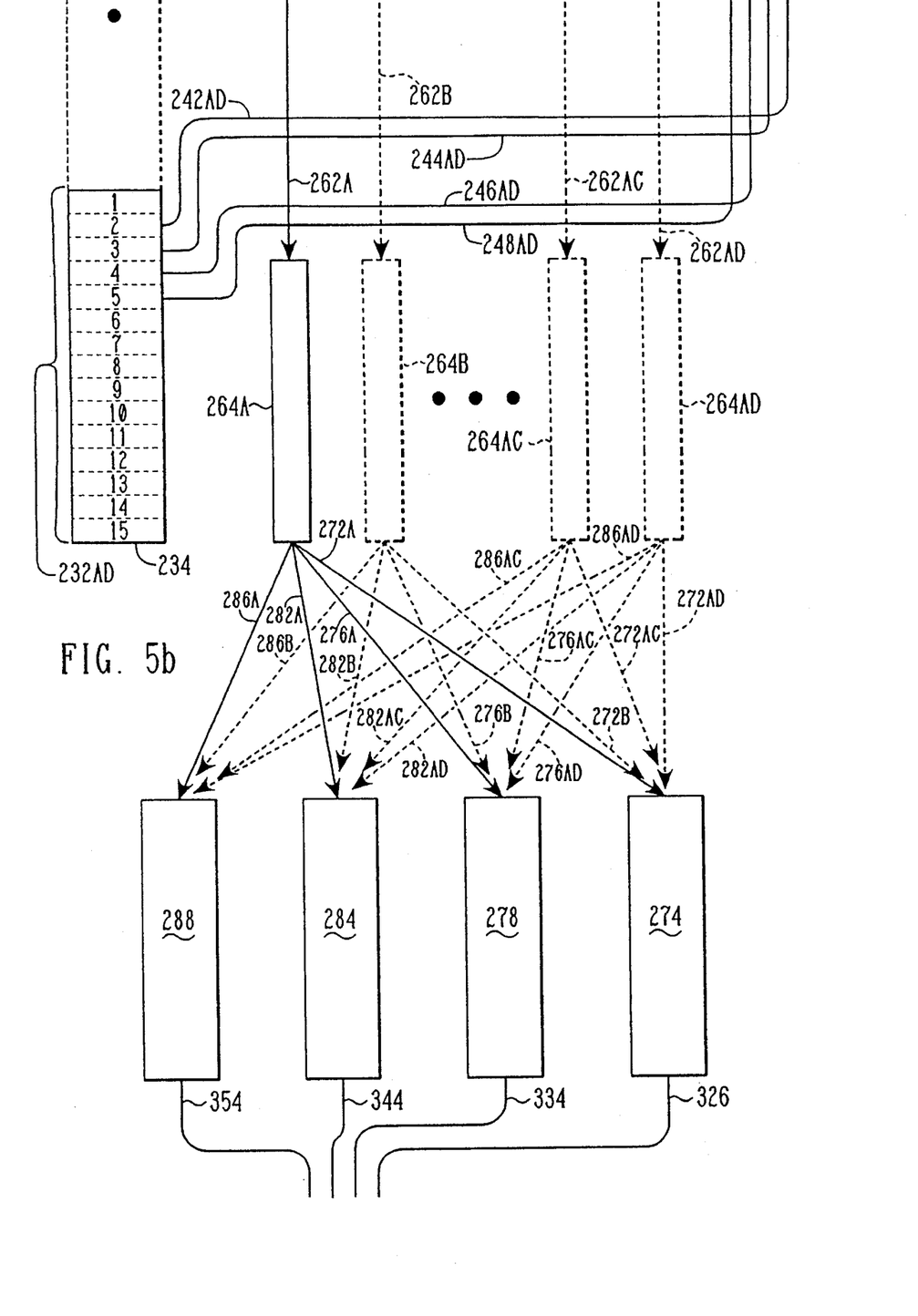
Figure 5C:
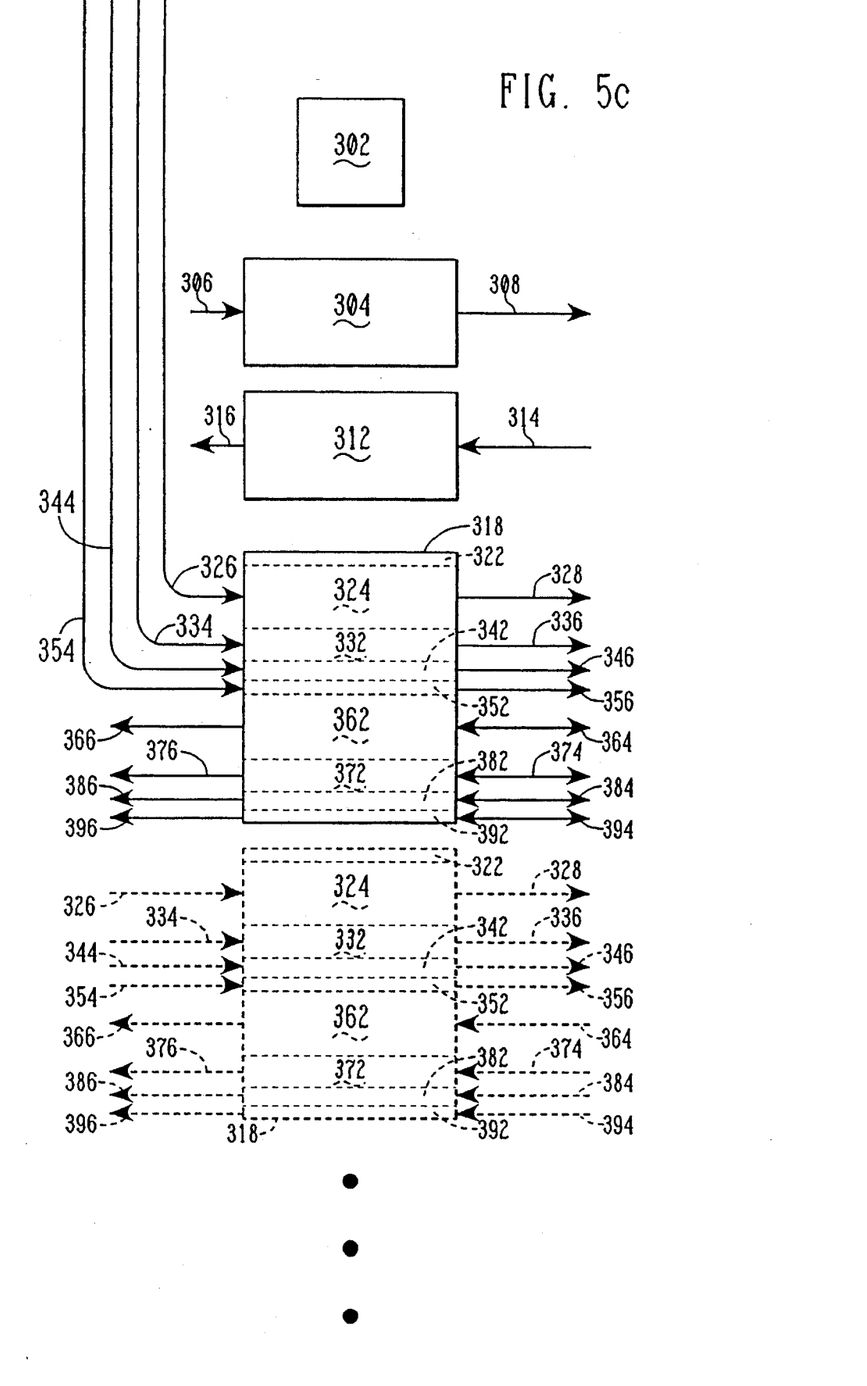

The diagram formed by combining FIGS. 5a, 5b and 5c in the manner illustrated in FIG. 5 depicts several different data structures which exist in the RAM included in the memory 126 and in the shared RAM 146 of the interface subsystem 100. The data structures depicted in the combined FIGS. 5a, 5b and 5c are used in exchanging audiovisual teleservices data with the I.400 layer 30, in processing such data through the H.221 layer 28, and in supplying video, audio, high-speed, and low-speed data to the application layer 44. To provide a comprehensive background of all information relevant to realizing such audiovisual teleservices, the applicants incorporate by reference as though fully set forth here CCITT's I.400, Q.921, Q.931, H.242 and H.221 Recommendations.

As described in TI's "TMS320C2x User's Guide" publication, the preferred digital signal processing circuit 122 includes a serial port together with two memory mapped 16-bit word registers for transmitting data from the serial port and for receiving data with the serial port. These registers are illustrated in the diagram FIG. 5a, and are respectively called data transmit register ("DXR") 202 and data receive register ("DRR") 204. The DXR 202 holds data that the digital signal processing circuit 122 transmits automatically from its serial port. The DRR 204 holds data received automatically by the serial port through the operation of the digital signal processing circuit 122. When the interface subsystem 100 exchanges data with an ISDN primary rate access 62, every 8 to 10 microseconds the digital signal processing circuit 122 generates an interrupt which requires a serial port interrupt handling routine, that is included in a multitasking computer program executed by the digital signal processing circuit 122, to load a 16-bit word into the DXR 202 for transmission from the serial port of the digital signal processing circuit 122, and to fetch a 16-bit word from the DRR 204 that has been received by the serial port of the digital signal processing circuit 122.

For supplying the next 16-bit word to the DXR 202 every 8 to 10 microseconds, indicated in FIG. 5a by a solid arrow 206, the RAM of the memory 126 contains a pair of linear buffers respectively called TXA 208A and TXB 208B. For receiving the next 16-bit word from the DRR 204 every 8 to 10 microseconds, indicated in FIG. 5a by a solid arrow 212, the RAM of the memory 126 contains another pair of linear buffers respectively called RXA 214A and RXB 214B. If the ISDN primary rate access 62 has twenty-four (24) time-slots, then each of the buffers TXA 208A, TXB 208B, RXA 214A and RXB 214B stores 960 16-bit words of data. If the ISDN primary rate access 62 has thirty (30) time-slots, then each of the buffers TXA 208A, TXB 208B, RXA 214A and RXB 214B stores 1280 16-bit words of data.

As the serial port interrupt handling routine responds to successive interrupts, it fetches words of data from successive locations in one of the linear buffers TXA 208A or TXB 208B, and stores words of data into successive locations in the corresponding one of the linear buffers RXA 214A or RXB 214B. When the serial port interrupt handling routine reaches the ends of the pair of linear buffers TXA 208A and RXA 214A, or TXB 208B and RXB 214B, it then transfers its operation to the beginning of the other pair of linear buffers. A pair of dashed arrows 216 and 218 in FIG. 5a indicate that while the linear buffers TXB 208B and RXB 214B are not presently being used to provide data to the DXR 202 and to receive data from the DRR 204, they will be so used upon exhaustion of the linear buffers TXA 208A and RXA 214A. In this way, the serial port interrupt handling routine continuously ping-pongs back and forth between one pair of linear buffers TXA 208A and RXA 214A, and the other pair of linear buffers TXB 208B and RXB 214B. Each time the serial port interrupt handling routine switches between one pair TXA 208A and RXA 214A and the other pair TXB 208B and RXB 214B it generates an interrupt that activates a foreground routine included in the multitasking computer program executed by the digital signal processing circuit 122. Upon each activation of the foreground routine by an interrupt generated by the serial port interrupt handling routine, the foreground routine processes the audiovisual information received by the digital signal processing circuit 122 that the serial port interrupt handling routine has just stored either into the RXA 214A or into the RXB 214B, and the foreground routine loads new audiovisual information either into the TXA 208A or into the TXB 208B thereby preparing it for subsequent transmission from the digital signal processing circuit 122.

The audiovisual information present in the RXA 214A or the RXB 214B when the serial port interrupt handling routine generates an interrupt must be processed in accordance with in CCITT's H.221 and H.242 Recommendations to extract the video, audio, high-speed, and low-speed data. In particular, the audiovisual information present in the RXA 214A or the RXB 214B must be processed within the H.221 layer 28 to recover the FAS and the BAS embedded in the audiovisual information. The H.221 layer 28 of a receiving terminal must process the audiovisual information in the RXA 214A or the RXB 214B to locate and extract the FAS and the BAS before it can properly extract the video, audio, high-speed, and low-speed data from received audiovisual information.

As set forth more fully in CCITT's H.221 Recommendation, at the lowest level audiovisual information is organized into groups called octets each of which holds eight (8) bits of digital data. Eighty (80) octets are then stacked vertically to form a frame that is eight (8) bits wide by eighty (80) octets high. When. audiovisual information exchanged over an ISDN B-channel 22 is organized in this way, the eighth bit in each octet, which forms a vertical column eighty (80) bits high along the right hand edge of the frame, is called the Service Channel ("SC"), FAS consists of eight (8) consecutive bits in the SC that are located in the upper right hand corner of the frame in the eighth bit of the first octet through the eighth bit of the eighth octet. For even numbered frames, FAS has the bit pattern "x0011011." For odd numbered frames, FAS has the bit pattern "x1xxxxxx." The value, 0 or 1, assigned to the first bit of FAS is used in specifying a multiframe structure described in greater detail below. The values assigned to the third through eight bits of FAS in odd numbered frames carry control, alarm, and error checking information.

Similar to FAS, BAS consists of eight (8) bits located immediately below the FAS in the SC in the eighth bit of the ninth octet through the eighth bit of the sixteenth octet. The BAS of each frame carries codewords which specify the protocol for exchanging audiovisual information, i.e. that specify a terminal's capabilities for transmitting and receiving audiovisual information and how the video, audio, high-speed, and low-speed data are to be multiplexed into the audiovisual information exchanged over the ISDN access(es).

For a H12-connection, for a H11-connection 72, and for a H0-connection 64, only one B-channel 22, called the I-channel, contains the FAS, the BAS, and any other control data specified in CCITT's H.221 Recommendation. When exchanging audiovisual information in accordance with the H.221 Recommendation, all the remaining B-channels 22 of such ISDN services carry only audiovisual information.

In addition to octets and frames, CCITT's H.221 Recommendation specifies a higher level structure called a multiframe that consists of sixteen (16) immediately successive frames of audiovisual information. Furthermore, CCITT's H.221 Recommendation subdivides each multiframe into eight (8) 2-frame submultiframes. The first bit of FAS in each frame carries multiframe information.

As illustrated in FIG. 5a, while the serial port interrupt handling routine is using the pair of linear buffers TXA 208A and RXA 214A for responding to serial port interrupts, as illustrated by the arrows 222A through 222AD the foreground routine transfers 16-bit words of data that have been previously stored in the RXB 214B into one or more circular buffers 224A through 224AD located in the RAM of the memory 126. If the interface subsystem 100 exchanges audiovisual information with a ISDN primary rate access 62, then each of the circular buffers 224 stores four (4) frames of audiovisual information. Dashed lines are used for outlining the circular buffers 224B through 224AD and for the arrows 222B through 222AD because circular buffers 224B through 224AD may or may not be needed for storing data from the RXB 214B or RXA 214A depending upon the type of ISDN access with which the interface subsystem 100 exchanges data. Each of the circular buffers 224A through 224AD stores audiovisual information received over one of the B-channels 22 of the ISDN access(es). Thus, if the interface subsystem 100 is exchanging information with a H12-connection, then all thirty (30) circular buffers 224A through 224AD are needed for storing audiovisual information received over that ISDN access. If the interface subsystem 100 is presently exchanging audiovisual information with the H11-connection 72, then only twenty-four (24) circular buffers 224A through 224X are needed for storing audiovisual information received over that ISDN access. If the interface subsystem 100 is exchanging audiovisual information over a single H0-connection 64, then six (6) circular buffers 224A through 224F are needed for storing audiovisual information. If the interface subsystem 100 is exchanging audiovisual information over one (1) to three (3) ISDN basic rate accesses 26, then only one (1) to six (6) circular buffers 224A through 224F are needed for storing audiovisual information.

Associated with each of the circular buffers 224A through 224AD is a fifteen (15) word long record 232A through 232AD in a B-channel directory 234 located in the RAM of the memory 126. The following table describes the location and data stored in the various words of each of the thirty (30) records 232A through 232AD in the B-channel directory 234.

| Word No. | Name | Description |
|---|---|---|
| 1 | SLOT | specifies the number of the particular time-slot in a ISDN primary rate access 62 to which this B-channel 22 is assigned. SLOT has a value of 0 to 23 for a H11-connection 72, and of 0 to 29 for a H12-connection. |
| 2 | START_ADDRESS | specifies the address of the first word in the circular buffer 224x associated with this record 232x in the B-channel directory 234. |
| 3 | END_ADDRESS | specifies the address of the last word in the circular buffer 224x associated with this record 232x in the B-channel directory 234. |
| 4 | WRITE_ADDRESS | specifies the address of the location in the circular buffer 224x associated with this record 232x in the B-channel directory 234 to which the next word from the RXA 214A or RXB 214B will be written. |
| 5 | ADDRESS0 | specifies the address of the byte location in the circular buffer 224x associated with this record 232x in the B-channel directory 234 at which a frame of audiovisual information begins. |
| 6 | BAS_STAT | stores a numerical value which indicates the present status of this B-channel. |
| 7 | FRAM_CNT | stores a numerical value used for counting frames and for monitoring frame alignment. |
| 8 | BAD_FRM | stores a numerical value used for recording bad frame alignment and for recovering frame alignment. |
| 9 | MF_SYNC | stores a history of the first bit in the SC of odd numbered frames, i.e. a history of the eighth bit in the first octet of odd number frames. MF_SYNC is used in detecting multiframe alignment. |
| 10 | MF_NUMBER | stores a history of the first bit in the SC of even numbered frames, i.e. a history of the eighth bit in the first octet of even number frames. MF_NUMBER specifies the number of the current frame in a multiframe. |
| 11 | MF_CNT | stores a numerical value used in counting sub-multiframes in a multiframe. |
| 12 | BAD_MF | stores a numerical value which indicates that multiframe alignment has not been achieved. |
| 13 | RX_BAS | stores the BAS code transmitted from another terminal to this terminal. |
| 14 | TX_FAS | stores the frame alignment word used in transmitting audiovisual information from this terminal. |
| 15 | TX_BAS | stores the bit-rate allocation signal transmitted from this terminal. |

An arrow 242A in FIG. 5a depicts specification by the START_ADDRESS word of the first record 232A in the B-channel directory 234 of the location of the first word in the circular buffer 224A. An arrow 244A depicts specification by the END_ADDRESS word of the location of the final word in the circular buffer 224A. An arrow 246A depicts specification by the WRITE_ADDRESS word in the first record 232A of the B-channel directory 234 of the location in the circular buffer 224A to which the next word from the RXA 214A or RXB 214B will be stored. An arrow 248A depicts specification by the ADDRESS0 word in the first record 232A of the B-channel directory 234 of the location in the circular buffer 224A of the first byte in the frames 252 of audiovisual information for this B-channel 22 in each of the circular buffers 224A through 224AD. FIGS. 5a and 5b include corresponding arrows 232AD, 234AD, 236AD and 238AD that depict specification by the last record 232AD in the B-channel directory 234 of the same relationships to the thirtieth circular buffer 224AD.

Each of the circular buffers 224A through 224AD stores audiovisual information from four or more consecutive frames 252, i.e. 160 16-bit words of audiovisual information. The dashed lines 254 indicate the boundary between contiguous frame-size areas of storage in the circular buffers 224A through 224AD. However, successive frames 252 of audiovisual information stored in the circular buffers 224A through 224AD are not necessarily, and in general will not be, aligned with the boundaries indicated by the dashed lines 254. The first and last words in each of the circular buffers 224A through 224AD are respectively aligned on a decimal forty (40) word boundary. Aligning the first and last words of the circular buffers 224A through 224AD on 40 word boundaries permits testing address wrap from the end of a circular buffer 224A through 224AD to its beginning only once at the end of each sequence of eighty (80) 16-bit word data transfers from the RXA 214A or RXB 214B to the respective circular buffers 224A through 224AD.

While the circular buffers 224A through 224AD depicted in FIG. 5a illustrate the skew that can occur between audiovisual information transmitted over independent B-channels 22, strictly speaking that diagram does not accurately depict receipt by the H.221 layer 28 in the interface subsystem 100 of audiovisual information from a H12-connection, from a H11-connection 72, from a single H0-connection 64, or from a single B-channel 22 of a ISDN basic rate access 26. As set forth above, the CCITT ISDN recommendation inherently preserves the inter B-channel phase relationship for the H12-connection, for the H11-connection 72 and for the H0-connection 64. That is, there is no skew such as that illustrated in FIG. 5a among the frames 252 of audiovisual information exchanged over the thirty (30) B-channels 22 in a H12-connection, over the twenty-four (24) B-channels 22 in an ISDN primary rate access 62, or over the six (6) B-channels 22 in a H0-connection 64. However, as stated above skew of the type illustrated in FIG. 5a may occur among B-channels 22 of two or more H0-connections 64, or among several B-channels 22 of one or more ISDN basic rate accesses 26. When using these latter types of ISDN services, the interface subsystem 100 of the present invention may properly align the audiovisual information in the several B-channels 22 only by locating the FAS embedded in the audiovisual information stored in the circular buffers 224A through 224AD.

In locating the FAS embedded in the audiovisual information stored in the circular buffers 224A through 224AD, as indicated by the arrows 262A through 262AD the computer program executed by the digital signal processing circuit 122 first moves a forty (40) word segment from each circular buffer 224A through circular buffer 224AD that store audiovisual information to sort buffers 264A through 264AD depicted in FIG. 5b that are located in the RAM of the memory 126. Even though the preferred digital signal processing circuit 122 addresses full words of memory, to facilitate finding the FAS and subsequent processing of the audiovisual information, each addressable word of eighty (80) in each of the sort buffers 264A through 264AD holds only one octet of audiovisual information. After the computer program has moved the audiovisual information into the sort buffers 264A through 264AD, it then scans only those sort buffers 264A through 264AD which contain I-channel audiovisual information looking for the FAS which must be present there. After the computer program executed by the digital signal processing circuit 122 establishes the location of the beginning of the frame 252 in the I-channel by finding the FAS in the sort buffers 264A through 264AD, it then assigns a value to ADDRESS0 in the appropriate records 232A through 232AD of the B-channel directory 234 which causes ADDRESS0 to specify the location of the beginning of the frame 252 in the appropriate circular buffers 224A through 224AD.

After proper values have been assigned to the ADDRESS0 words for all circular buffers 224A through 224AD that hold audiovisual information, the computer program executed by the digital signal processing circuit 122 then transfers frames 252 of audiovisual information from the circular buffers 224A through 224AD storing audiovisual information into the sort buffers 264A through 264AD with the octets of data organized as described previously. With all the frames of audiovisual data thus properly registered into the sort buffers 264A through 264AD, the computer program executed by the digital signal processing circuit 122 then extracts the BAS from the I-channel's audiovisual information. At this time the computer program executed by the digital signal processing circuit 122 also processes the audiovisual information in accordance with CCITT's H.221 Recommendation to extract video, audio, high-speed, and low-speed data, and as indicated by arrows 272A through 272AD appropriately stores the video data into a received video data buffer 274, as indicated by arrows 276A through 276AD appropriately stores the audio data into a received audio data buffer 278, as indicated by arrows 282A through 282AD appropriately stores the high-speed data into a received high-speed data buffer 284, and as indicated by arrows 286A through 286AD appropriately stores the low-speed data into a received low-speed data buffer 288. The received video data buffer 274, the received audio data buffer 278, the received high-speed data buffer 284 and the received low-speed data buffer 288 are all located in the RAM of the memory 126.

For supplying audiovisual information to the TXA 208A and TXB 208B, the foreground task employs data storage structures in the RAM of the memory 126 that are equivalent to those described thus far for processing received audiovisual information stored into the RXA 214A and RXB 214B except that it omits the circular buffers 224A through 224AD. Thus, the foreground task in preparing video, audio, high-speed, and low-speed data for transfer to the TXA 208A and TXB 208B by the serial port interrupt routine uses duplicates of the received low-speed data buffer 288, the received high-speed data buffer 284, the received audio data buffer 278, the received video data buffer 274, and the sort buffers 264A through 264AD.

Referring now to FIGS. 5b and 5c, the shared RAM 146 included in the host computer interface circuit 144 provides storage for various data structures used in exchanging a variety of messages, and video, audio, high-speed, and low-speed data between the interface subsystem 100 and the host digital computer (not illustrated in any of the FIGS.). Thus, the shared RAM 146 stores a pointer structure 302 which holds addresses of other structures used in effecting the exchange of messages and data. To avoid confusing complexity in FIG. 5c, details of the addresses stored in pointer structure 302 have been omitted from that FIG. The information stored in the pointer structure 302 functions analogously to the START_ADDRESS, END_ADDRESS, WRITE_ADDRESS and ADDRESS0 stored in each of the records 232A through 232AD in the B-channel directory 234. Information stored in the pointer structure 302 permits computer programs executed by digital signal processing circuit 122 and by the host digital computer to access the structures present in the shared RAM 146 that are used in effecting the exchanges of messages and of data. The computer programs executed by the digital signal processing circuit 122 and by the host digital computer may also use information stored in the pointer structure 302 for monitoring the status of these structures.

The information stored in the pointer structure 302 permits the computer program executed by the digital signal processing circuit 122 to place messages for the host digital computer into a host computer message queue 304 located in the shared RAM 146. The host computer message queue 304 receives messages from the computer program executed by the digital signal processing circuit 122, as indicated by an arrow 306, from which the computer program executed by the host digital computer fetches them, as indicated by an arrow 308. Information stored in the pointer structure 302 also permits the computer program executed by the digital signal processing circuit 122 to access messages stored in an interface subsystem message queue 312 located in the shared RAM 146. The interface subsystem message queue 312 receives messages from the host digital computer, indicated by an arrow 314, from which the computer program executed by the digital signal processing circuit 122 fetches them, as indicated by an arrow 316.

In addition to the host computer message queue 304 and the interface subsystem message queue 312, the pointer structure 302 also permits computer programs executed both by the digital signal processing circuit 122 and by the host digital computer to exchange video, audio, high-speed, and low-speed data stored in one or more session blocks 318 located in the shared RAM 146. One session block 318 is required for each individual set of video, audio, high-speed, and low-speed data that the interface subsystem 100 exchanges over an individual ISDN connection, such as over an individual H0-connection 64 or an individual B-channel 22. Included in each session block 318 is a session ID 322 that uniquely identifies each session and its associated individual ISDN connection.

Each session block 318 also includes a received video circular buffer 324. The computer program executed by the digital signal processing circuit 122 fetches video data from the received video data buffer 274 and stores it into the received video circular buffer 324 as indicated by an arrow 326. The computer program executed by the host digital computer fetches video data from the received video circular buffer 324 as indicated by an arrow 328. The session block 318 also includes a received audio circular buffer 332. The computer program executed by the digital signal processing circuit 122 fetches audio data from the received audio data buffer 278 and stores it into the received audio circular buffer 332 as indicated by an arrow 334. The computer program executed by the host digital computer fetches audio data from the received audio circular buffer 332 as indicated by an arrow 336. The session block 318 also includes a received high-speed data circular buffer 342. The computer program executed by the digital signal processing circuit 122 fetches high-speed data from the received high-speed data buffer 284 and stores it into the received high-speed data circular buffer 342 as indicated by an arrow 344. The computer program executed by the host digital computer fetches high-speed data from the received high-speed data circular buffer 342 as indicated by an arrow 346. The session block 318 also includes a received low-speed data circular buffer 352. The computer program executed by the digital signal processing circuit 122 fetches low-speed data from the received low-speed data buffer 288 and stores it into the received low-speed data circular buffer 352 as indicated by an arrow 354. The computer program executed by the host digital computer fetches low-speed data from the received low-speed data circular buffer 352 as indicated by an arrow 356.

Each session block 318 also includes a transmitted video circular buffer 362. The computer program executed by the host digital computer stores video data to be transmitted from the interface subsystem 100 into the transmitted video circular buffer 362 as indicated by the arrow 364. The computer program executed by the digital signal processing circuit 122 fetches video data stored in the transmitted video circular buffer 362 and stores it into a transmitted video data buffer (not illustrated in any of the FIGS,) as indicated by an arrow 366. The session block 318 also includes a transmitted audio circular buffer 372. The computer program executed by the host digital computer stores audio data to be transmitted from the interface subsystem 100 into the transmitted audio circular buffer 372 as indicated by an arrow 374. The computer program executed by the digital signal processing circuit 122 fetches audio video data stored in the transmitted audio circular buffer 372 and stores it into a transmitted audio data buffer (not illustrated in any of the FIGS.) as indicated by an arrow 376. The session block 318 also includes a transmitted high-speed data circular buffer 382. The computer program executed by the host digital computer stores high-speed data to be transmitted from the interface subsystem 100 into the transmitted high-speed data circular buffer 382 as indicated by an arrow 384. The computer program executed by the digital signal processing circuit 122 fetches high-speed data stored in the transmitted high-speed data circular buffer 382 and stores it into a transmitted high-speed data buffer (not illustrated in any of the FIGS.) as indicated by an arrow 386. The session block 318 also includes a transmitted low-speed data circular buffer 392. The computer program executed by the host digital computer stores low-speed data to be transmitted from the interface subsystem 100 into the transmitted low-speed data circular buffer 392 as indicated by an arrow 394. The computer program executed by the digital signal processing circuit 122 fetches low-speed data stored in the transmitted low-speed data circular buffer 392 and stores it into a transmitted low-speed data buffer (not illustrated in any of the FIGS.) as indicated by an arrow 396.

The presence of multiple session blocks 318 in the shared RAM 146 permits the interface subsystem 100 to adapt efficiently and flexibly to differing communication environments. For example, the interface subsystem 100 may exchange a single stream of audiovisual information with two H0-connections 64 in order to obtain a data transmission rate of 768 kbps. Under such circumstances the two H0-connections 64 function as a single connection, and the shared RAM 146 need only provide a single session block 318 having a single set of circular buffers 324, 332, 342, 352, 362, 372, 382, and 392 through which pass all video, audio, high-speed, and low-speed data.

Alternatively, the interface subsystem 100 may exchange two separate streams of audiovisual information with two H0-connections 64. In this second operating environment the two H0-connections 64 operate as individual ISDN connections, and the shared RAM 146 must provide at least two session blocks 318 having two individual and independent sets of circular buffers 324, 332, 342, 352, 362, 372, 382, and 392 through which pass separate streams of video, audio, high-speed, and low-speed data. This second operating mode for the interface subsystem 100 adapts it for engaging in conference audiovisual teleservices in which the interface subsystem 100 receives two different telecommunications and the H.221 layer 28 preserves the identity of the two communications in the video, audio, high-speed, and low-speed data that it exchanges with the application layer 44. By preserving the identity of the two communications in the data exchanged between the interface subsystem 100 and the host digital computer, the interface subsystem 100 permits the computer program executed by the host digital computer to synthesize a composite display perhaps presenting one-half of the data from each of the individual audiovisual teleservices on one-half of a display's screen. Alternatively, the computer program executed by the host digital computer might use the display's entire screen for one of the audiovisual teleservices while presenting the other audiovisual teleservices in a small window located within the larger display.

When operating to preserve the identity of two or more separate communications which the interface subsystem 100 exchanges with individual ISDN connections, the computer program executed by the digital signal processing circuit 122 establishes the identity of such communications in transferring the audiovisual information out of the circular buffers 224A through 224AD storing audiovisual information into the sort buffers 264A through 264AD. Thus, when the interface subsystem 100 operates in this manner the computer program executed by the digital signal processing circuit 122 distinguishes among identifiable groups in the sort buffers 264A through 264AD that respectively store audiovisual information for separate communications.

To control the operation of the interface subsystem 100 for exchanging video, audio, high-speed, and low-speed data with the host digital computer as outlined above, the computer programs executed by the digital signal processing circuit 122 and the host digital computer exchange various messages via the host computer message queue 304 and the interface subsystem message queue 312. Listed below are various messages specifically related to audiovisual teleservice communications that the computer program executed by the digital signal processing circuit 122 may place into the host computer message queue 304.

NEW_RX_BAS

This message informs the host digital computer that the computer program executed by the digital signal processing circuit 122 has identified a new and significant BAS in the received audiovisual information.

NEW_TX_BAS

This message informs the host digital computer that the computer program executed by the digital signal processing circuit 122 has begun preparing audiovisual information for transmission from the interface subsystem 100 in a new and significantly different way.

RX_FRAMING_LOST

This message informs the host digital computer of the loss of frame or multiframe synchronization in the received audiovisual information.

TX_FRAMING_LOST

This message informs the host digital computer that the terminal receiving audiovisual information transmitted from the interface subsystem 100 has reported a loss of frame or multiframe synchronization.

H221_SYNC

This message informs the host digital computer that H.221 frame synchronization has been achieved both by the interface subsystem 100 for received audiovisual information, and by the terminal receiving audiovisual information transmitted from the interface subsystem 100.

NEW_CAPABILITY

This message informs the host digital computer that a specification of new capabilities in accordance with CCITT's H.242 Recommendation has been received in the audiovisual information.

RX_QUE_FULL

This message informs the host digital computer that the received video circular buffer 324, the received audio circular buffer 332, the received high-speed data circular buffer 342, or the received low-speed data circular buffer 352 is full, and that computer program executed by the digital signal processing circuit 122 has begun discarding received video, audio, high-speed, and/or low-speed data.

TX_QUE_EMPTY

This message informs the host digital computer that the transmitted video circular buffer 362, the transmitted audio circular buffer 372, the transmitted high-speed data circular buffer 382 and/or the transmitted low-speed data circular buffer 392 is empty, and unless the computer program executed by the digital signal processing circuit 122 has been properly prepared for the occurrence of this condition by a message from the host digital computer, then the interface subsystem 100 begins transmitting zeros (0) as audiovisual information.

Listed below are various messages specifically related to audiovisual teleservice communications that the computer program executed by the digital signal processing circuit 122 may retrieve from the interface subsystem message queue 312.

SET_CAPABILITIES

This message instructs the computer program executed by the digital signal processing circuit 122 to transmit a specification of new capabilities in accordance with CCITT's H.242 Recommendation to the terminal receiving audiovisual information from the interface subsystem 100.

GET_CAPABILITIES

This message instructs the computer program executed by the digital signal processing circuit 122 to send a NEW_CAPABILITIES message back to the host computer informing it of the present capabilities of the other terminal.

IMMEDIATE_BAS

This message instructs the computer program executed by the digital signal processing circuit 122 to transmit specified BAS codes to the terminal receiving audiovisual information from the interface subsystem 100, and to transmit subsequent audiovisual information in accordance with the specified BAS codes.

FRAME_CHANNEL

This message instructs the computer program executed by the digital signal processing circuit 122 to initiate framing in accordance with CCITT's H.221 Recommendation for a specified session's audiovisual teleservices.

IMMEDIATE_BAS_SWITCH

This message instructs the computer program executed by the digital signal processing circuit 122 to transmit specified BAS codes to the terminal receiving audiovisual information from the interface subsystem 100, to transmit subsequent audiovisual information in accordance with the specified BAS codes, and to begin exchanging video, audio, high-speed, and low-speed data with circular buffers in a different session block 318.

EMPTY_BAS_SWITCH

This message instructs the computer program executed by the digital signal processing circuit 122 to transmit specified BAS codes to the terminal receiving audiovisual information from the interface subsystem 100, and to beginning transmitting subsequent audiovisual information in accordance with the specified BAS codes when the transmitted video circular buffer 362, the transmitted audio circular buffer 372, the transmitted high-speed data circular buffer 382 or the transmitted low-speed data circular buffer 392 becomes empty.

MEMORY_CONTROL

This message instructs the computer program executed by the digital signal processing circuit 122 to begin or to terminate storing data into the received video circular buffer 324, the received audio circular buffer 332, the received high-speed data circular buffer 342, or the received low-speed data circular buffer 352, or fetching data from the transmitted video circular buffer 362, the transmitted audio circular buffer 372, the transmitted high-speed data circular buffer 382, or the transmitted low-speed data circular buffer 392 as specified in the message. By transmitting this message the computer program executed by the host digital computer selects among the video, audio, high-speed, and low-speed data for storage into the circular buffers 324, 332, 342 and 352 by the computer program executed by the digital signal processing circuit 122. This message also permits the computer program executed by the host digital computer to select among video, audio, high-speed, and low-speed data for transmission from the circular buffers 362,372,382, and 392 by the interface subsystem 100.

In addition to the various messages listed above that relate specifically to audiovisual teleservice communications, the computer programs executed by the digital signal processing circuit 122 and by the host digital computer also exchange a variety of messages related to establishing and terminating audiovisual teleservices such as placing a telephone call, accepting a telephone call, and responding to various other type of telephone system control signals such as dual-tone multifrequency ("DTMF") signals.

Industrial Applicability

An interface subsystem 100 having circular buffers 224A through 224AD which provide storage for only one-hundred and twenty (120) frames 252 of audiovisual information in the RAM of the memory 126 permits only a limited amount of skew between independent B-channels 22 that are collectively providing a single audiovisual teleservice. For example, if audiovisual information is being exchanged over two H0-connections 64 to obtain a combined data transmission rate of 768 kbps, then the interface subsystem 100 can accommodate approximately 140 milliseconds of skew between them. Under such circumstances, storage for twenty-four (24) frames 252 is assigned to the circular buffers 224A through 224F for the six (6) B-channels 22 that arrive latest in time. The remaining storage for ninety-six (96) frames 252 is assigned to the circular buffers 224G through 224L for the six (6) B-channels 22 that arrive earliest in time. If the skew between two such H0-connections 64 exceeds the maximum allowed, then one of the two connections must be terminated and the telephone call replaced until two connections are obtained that have an acceptable amount of skew. If it should be necessary to accommodate a larger amount of skew between independent B-channels 22, that can be accomplished simply by increasing the amount of storage in the RAM of the memory 126 available for the circular buffers 224.

The received video circular buffer 324, the received audio circular buffer 332, the received high-speed data circular buffer 342, and the received low-speed data circular buffer 352 provide host computer interface receiving buffers for received video, audio, high-speed, and low-speed data after it has been extracted from the audiovisual information. Similarly, the transmitted video circular buffer 362, the transmitted audio circular buffer 372, the transmitted high-speed data circular buffer 382 and the transmitted low-speed data circular buffer 392 provide host computer interface transmitting buffers for supplying video, audio, high-speed, and low-speed data for transmission from the interface subsystem 100 as audiovisual information. While the preferred embodiment of the interface subsystem 100 employs circular buffers 324, 332, 342, and 352, other structures are known which function equivalently to the circular buffers 324, 332, 342 and 352. In particular, first-in first-out structures ("FIFOs") are equivalent to and may be used in place of the combined received video data buffer 274 and received video circular buffer 324, the combined received audio data buffer 278 and received audio circular buffer 332, the combined received high-speed data buffer 284 and received high-speed data circular buffer 342, and the combined received low-speed data buffer 288 and received low-speed data circular buffer 352. Similarly, FIFOS are equivalent to and may be used in place of the combined transmitted video circular buffer 362 and transmitted video data buffer, the combined transmitted audio circular buffer 372 and transmitted audio data buffer, the combined transmitted high-speed data circular buffer 382 and transmitted high-speed audio data buffer, and the combined transmitted low-speed data circular buffer 392 and transmitted low-speed data buffer.

While the structure and operation of the interface subsystem 100 has been explained in the context of exchanging audiovisual teleservices using ISDN communications, the interface subsystem 100 accommodates other digital telecommunication services that are compatible with CCITT's H.221 Recommendation such as T1 Switched 56. The interface subsystem 100 may be easily used for transmitting and/or receiving any type of digital data using ISDN communications. Such use of the interface subsystem 100 may be realized without altering the multitasking computer program executed by the digital signal processing circuit 122. Rather, the interface subsystem 100 may be used for transmitting and/or receiving any type of digital data through the use of a suitable application layer computer program executed by the host digital computer.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. An interface subsystem adapted for exchanging digital audiovisual information using digital telecommunications, said interface subsystem also exchanging video and audio data with a host digital computer, said interface subsystem comprising:

a first digital telecommunications interface circuit for exchanging digital audiovisual information with a first digital telecommunications access;

a host computer interface circuit for exchanging video and audio data with the host digital computer;

a random access memory for storing digital audiovisual information and video and audio data received from said interface circuits, said random access memory containing a plurality of sort buffers, each addressable location in said sort buffers holding at least one octet of audiovisual information received from the digital telecommunications access, the octets while present in said sort buffers being scanned to locate a frame alignment signal ("FAS") embedded therein;

a programmable digital signal processing circuit coupled to said interface circuits and to said random access memory for controlling the operation of said interface circuits, for exchanging digital audiovisual information with said digital telecommunications interface circuit, for exchanging video and audio data with the host computer interface circuit, and for processing digital audiovisual information, and video and audio data.

2. The interface subsystem of claim 1 further comprising a second digital telecommunications interface circuit for exchanging digital audiovisual information with a second digital telecommunications access.

3. The interface subsystem of claim 2 wherein said first digital telecommunications interface circuit exchanges digital audiovisual information with an Integrated Services Digital Network ("ISDN") basic rate access.

4. The interface subsystem of claim 3 wherein said second digital telecommunications interface circuit exchanges digital audiovisual information with a plurality of ISDN basic rate accesses.

5. The interface subsystem of claim 4 wherein said programmable digital signal processing circuit synchronizes digital audiovisual information concurrently received by said first interface subsystem and said second interface subsystem from the several ISDN basic rate accesses.

6. The interface subsystem of claim 1, wherein said first digital telecommunications interface circuit exchanges digital audiovisual information with an ISDN primary rate access.

7. The interface subsystem of claim 6 wherein said programmable digital signal processing circuit synchronizes digital audiovisual information concurrently received by the first interface subsystem from the ISDN primary rate access.

8. The interface subsystem of claim 6 wherein said programmable digital signal processing circuit multiplexes digitized video and audio data exchanged over the several telecommunications accesses.

9. The interface subsystem of claim 1 wherein a read only memory ("ROM") included in the random access memory stores a computer program executed by said programmable digital signal processing circuit.

10. The interface subsystem of claim 1 wherein said programmable digital signal processing circuit receives each successive word of digital audiovisual information following the receipt of such information by said digital telecommunications interface circuit.

11. The interface subsystem of claim 1 wherein said programmable digital signal processing circuit transmits each successive word of digital audiovisual information to said digital telecommunications interface circuit.

12. The interface subsystem of claim 1 wherein said programmable digital signal processing circuit controls the operation of said digital telecommunications interface circuit in response to initiation of digital telecommunications service.

13. The interface subsystem of claim 1 wherein said programmable digital signal processing circuit controls the operation of said digital telecommunications interface circuit to initiate digital telecommunication service.

14. The interface subsystem of claim 1 wherein said random access memory contains a plurality of receiving circular buffers for receiving a plurality of frames of audiovisual information from said digital telecommunications interface circuit.

15. The interface subsystem of claim 1 wherein after the FAS has been located in said sort buffers, said sort buffers receive successive frames of audiovisual information from the digital telecommunications access, the audiovisual information so received being registered in said sort buffers with the FAS located in the eighth bit of the first octet through the eighth bit of the eighth octet in said sort buffers.

16. The interface subsystem of claim 1 wherein after the FAS has been located in said sort buffers, video data and audio data are extracted from the audiovisual information in said sort buffers and stored into individual receiving data buffers.

17. The interface subsystem of claim 16 wherein said individual receiving data buffers are located in said random access memory of said interface subsystem.

18. The interface subsystem of claim 1 wherein a set of host computer interface receiving buffers may store video data and audio data after such data has been extracted out of the received audiovisual information, such data being removable from said set of host computer interface receiving buffers by the host digital computer.

19. The interface subsystem of claim 18 wherein said set of host computer interface receiving buffers are located in a shared random access memory located in said host computer interface circuit that may be accessed directly both by said digital signal processing circuit and by the host digital computer.

20. The interface subsystem of claim 18 wherein said digital telecommunications interface circuit receives a single stream of audiovisual information from a plurality of digital telecommunication connections, and video data and audio data are stored into said set of host computer interface receiving buffers after being extracted from such audiovisual information.

21. The interface subsystem of claim 18 wherein said host computer interface receiving buffers are circular buffers.

22. The interface subsystem of claim 18 adapted for receiving a message from the host digital computer for selecting among video data and audio data for storage into the set of host computer interface receiving buffers.

23. The interface subsystem of claim 18 adapted for transmitting a message to the host digital computer specifying that the set of host computer interface receiving buffers are full of data.

24. The interface subsystem of claim 1 adapted for receiving video data and audio data data stored into a set of host computer interface transmitting buffers by the host digital computer for transmission from said digital telecommunications interface circuit as audiovisual information.

25. The interface subsystem of claim 24 adapted for receiving a message from the host digital computer for selecting among video data and audio data in said set of host computer interface transmitting buffers for transmission from said digital telecommunications interface circuit as audiovisual information.

26. The interface subsystem of claim 24 adapted for transmitting a message to the host digital computer specifying that the set of host computer interface transmitting buffers lack data.

27. The interface subsystem of claim 24 adapted for receiving a message from the host digital computer specifying that audiovisual information is to be transmitted in accordance with a new bit-rate allocation signal ("BAS") as soon as the host computer interface transmitting buffers lack data.

28. The interface subsystem of claim 27 adapted for receiving video data and audio data stored by the host digital computer into individual sets of host computer interface transmitting buffers for transmission by said digital telecommunications interface circuit as separate audiovisual information carried by individual digital telecommunications connections.

29. The interface subsystem of claim 1 adapted for storing into individual sets of host computer interface receiving buffers video data and audio data extracted from audiovisual information received by said digital telecommunications interface circuit from individual digital telecommunications connections.

30. The interface subsystem of claim 1 adapted for transmitting a message to the host digital computer specifying that received audiovisual information included a new BAS.

31. The interface subsystem of claim 1 adapted for transmitting a message to the host digital computer specifying that audiovisual information is now being transmitted in accordance with a new BAS.

32. The interface subsystem of claim 1 adapted for receiving a message from the host digital computer specifying that audiovisual information is to be transmitted in accordance with a new BAS.

* * * * *